(12) United States Patent
Shimahara

(10) Patent No.: US 11,719,270 B2
(45) Date of Patent: Aug. 8, 2023

(54) EXPANSION ANCHOR WITH A NONAXISYMMETRIC RECESS

(71) Applicant: Hilti Aktiengesellschaft, Schaan (LI)

(72) Inventor: Hideki Shimahara, Grabs (CH)

(73) Assignee: Hilti Akiiengesellschaft, Schaan (LI)

( * ) Notice: Subject to any disclaimer, the term of this patent is extended or adjusted under 35 U.S.C. 154(b) by 452 days.

(21) Appl. No.: 17/053,561

(22) PCT Filed: Jun. 7, 2019

(86) PCT No.: PCT/EP2019/064958
§ 371 (c)(1),
(2) Date: Nov. 6, 2020

(87) PCT Pub. No.: WO2019/243084
PCT Pub. Date: Dec. 26, 2019

(65) Prior Publication Data
US 2021/0231150 A1 Jul. 29, 2021

(30) Foreign Application Priority Data

Jun. 20, 2018 (EP) .................................... 18178750

(51) Int. Cl.
*F16B 13/06* (2006.01)
(52) U.S. Cl.
CPC ............ *F16B 13/065* (2013.01); *F16B 13/06* (2013.01)
(58) Field of Classification Search
CPC ...... F16B 13/06; F16B 13/063; F16B 13/065; F16B 13/066; F16B 13/122; F16B 13/124; F16B 13/128

USPC ....... 411/15, 32–33, 44, 53, 57.1, 60.1–60.2, 411/63, 80.5
See application file for complete search history.

(56) References Cited

U.S. PATENT DOCUMENTS

| | | | |
|---|---|---|---|
| 4,287,807 A | 9/1981 | Pacharis et al. | |
| 4,883,395 A * | 11/1989 | Klaric | F16B 35/00 411/55 |
| 4,898,505 A | 2/1990 | Froehlich et al. | |
| 4,968,200 A * | 11/1990 | Mark | F16B 13/065 411/60.1 |
| 5,211,512 A | 5/1993 | Frischmann et al. | |

(Continued)

FOREIGN PATENT DOCUMENTS

| | | |
|---|---|---|
| CH | 591637 A5 | 9/1977 |
| CN | 102182737 A | 9/2011 |

(Continued)

OTHER PUBLICATIONS

International Search Report of PCT/EP2019/064958, dated Jul. 29, 2019.

*Primary Examiner* — Roberta S Delisle
(74) *Attorney, Agent, or Firm* — Davidson, Davidson & Kappel, LLC

(57) ABSTRACT

An expansion anchor having an anchor bolt, an expansion sleeve surrounding the anchor bolt, and an expansion body located in a front region of the anchor bolt, wherein the expansion body has a converging zone for expanding the expansion sleeve, and wherein the expansion body is provided with at least one expansion body recess. The at least one expansion body recess is delimited by an expansion sleeve abutment wall, and the at least one expansion body recess has a nonaxisymmetric cross-section.

19 Claims, 5 Drawing Sheets

(56) References Cited

U.S. PATENT DOCUMENTS

| | | | | |
|---|---|---|---|---|
| 5,816,760 | A * | 10/1998 | Mattner | F16B 13/004 411/52 |
| 6,524,046 | B2 * | 2/2003 | Hsu | F16B 13/065 411/61 |
| 9,765,804 | B2 * | 9/2017 | Schaeffer | F16B 13/066 |
| 10,781,842 | B2 * | 9/2020 | Schaeffer | F16B 13/065 |
| 2001/0010787 | A1 | 8/2001 | Hsu et al. | |
| 2008/0008553 | A1 | 1/2008 | Gillis et al. | |
| 2011/0081217 | A1 | 4/2011 | Wissling et al. | |
| 2013/0097845 | A1 | 4/2013 | Schaeffer et al. | |
| 2014/0072384 | A1 * | 3/2014 | Wissling | F16B 13/063 411/44 |
| 2014/0133933 | A1 | 5/2014 | Shimahara et al. | |
| 2016/0053793 | A1 | 2/2016 | Trautwein et al. | |
| 2016/0238052 | A1 | 8/2016 | Schaeffer et al. | |
| 2016/0290374 | A1 | 10/2016 | Gstach et al. | |
| 2016/0298667 | A1 | 10/2016 | Gstach et al. | |
| 2017/0145684 | A1 | 5/2017 | Merrick et al. | |
| 2018/0073537 | A1 | 3/2018 | Gstach et al. | |
| 2018/0094666 | A1 | 4/2018 | Gstach et al. | |
| 2020/0224695 | A1 | 7/2020 | Steinberg et al. | |

FOREIGN PATENT DOCUMENTS

| | | |
|---|---|---|
| CN | 105121869 A | 12/2015 |
| CN | 105705804 A | 6/2016 |
| CN | 107429721 A | 12/2017 |
| DE | 2744666 A1 | 4/1979 |
| DE | 3411285 | 10/1985 |
| EP | 2256822 A1 | 6/1974 |
| EP | 0515916 A2 | 12/1992 |
| EP | 2309138 A2 | 4/2011 |
| EP | 2514979 A1 | 10/2012 |
| EP | 2848825 A1 | 3/2015 |
| EP | 3477125 A1 | 5/2019 |
| EP | WO2019081300 A1 | 5/2019 |
| JP | H01135905 A | 5/1989 |
| SU | 1530837 A1 | 12/1989 |
| WO | WO12126700 A1 | 9/2012 |
| WO | WO15067578 A1 | 5/2015 |

* cited by examiner

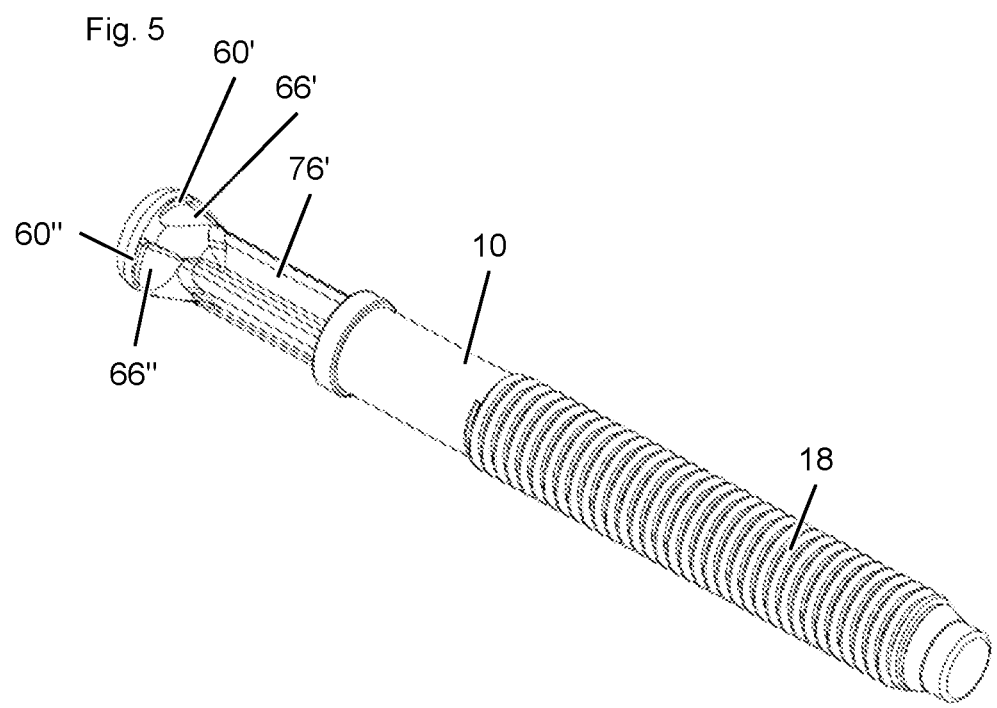
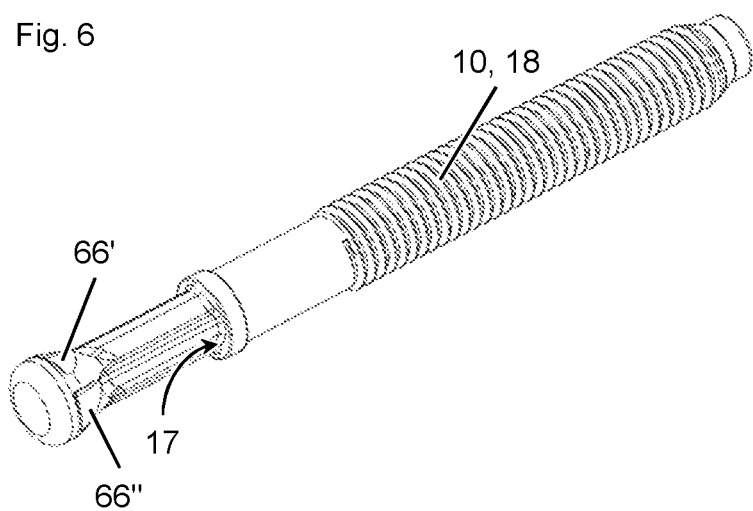

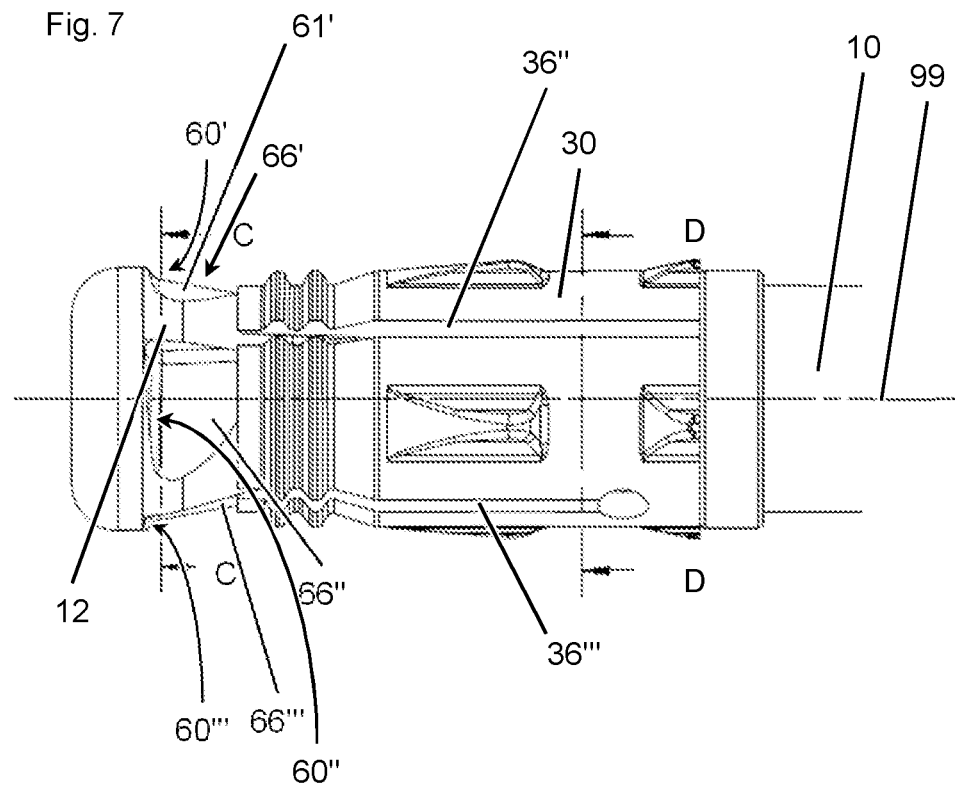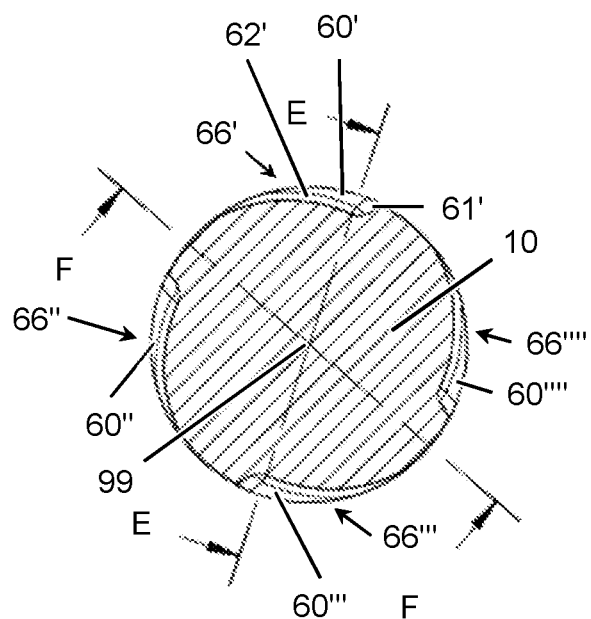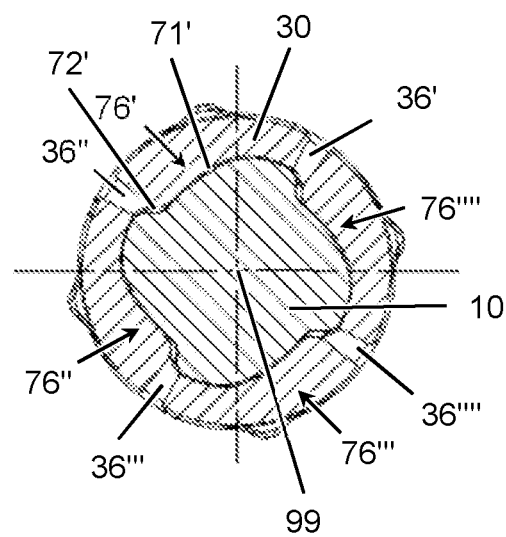

E - E

F - F

EXPANSION ANCHOR WITH A NONAXISYMMETRIC RECESS

The invention relates to an expansion anchor. Such an anchor is provided with an anchor bolt, an expansion sleeve surrounding the anchor bolt, and an expansion body located in a front region of the anchor bolt, wherein the expansion body has a converging zone for expanding the expansion sleeve, and wherein the expansion body is provided with at least one expansion body recess.

BACKGROUND

European patent application with application file number 17198246.5, published as EP 3701155 A1, describes an expansion anchor with expansion sleeve abutment walls provided on the expansion body. The expansion sleeve abutment walls can engage with the expansion sleeve to provide an interlock when the anchoring process has reached an advanced state. This interlock can increase the resistance against pull-out of the expansion body out of the expansion sleeve without significant additional expansion of the expansion sleeve, i.e. without additional stressing the concrete. Preferably, the expansion anchor has recesses in its expansion body, and the sleeve abutment walls are provided at the forward ends of these recesses.

WO15067578 A1 describes an expansion anchor having grooves that are closed with respect to the front end of the anchor disposed in the expansion body, wherein the grooves reduce a contact surface between the expansion sleeve and the converging zone of the expansion body. In particular, the individual grooves are relatively narrow in order to avoid that the expansion sleeve is bent into the grooves when the expansion sleeve is expanded.

EP2848825 A1 discloses an expansion anchor in which the expansion sleeve has at least one web on its inner side, which web engages a groove provided in the neck of the anchor bolt. During installation, this web is displaced radially outwardly by the expansion body, i.e. the material of the web is activated, to yield particularly wide expansion.

EP2514979 A1 shows an anchor bolt with an eccentric region that widens the expansion sleeve upon rotation of the anchor bolt.

EP2309138 A2 shows an expansion body having longitudinal edges.

DE2256822 A1 discloses an expansion anchor in which a rotational lock is provided between the expansion sleeve and the anchor bolt. This rotational lock might be formed by a groove extending into the expansion body of the bolt, and a corresponding protrusion, which protrudes from the expansion sleeve. In one embodiment of DE2256822 A1, the groove extends axially all along the expansion body and the protrusion extends axially all along the expansion sleeve. In another embodiment, the protrusion is shorter and offset from the expansion sleeve tip towards the rear end of the expansion sleeve.

WO12126700 A1 describes expansion anchors having radially protruding webs on their expansion bodies, which webs can act upon the inside of the expansion sleeves of the anchors.

CH591637 A5 discloses an expansion anchor having a ring-shaped shoulder at the front end of the expansion body. DE 2744666 A1 and U.S. Pat. No. 4,287,807 A each disclose anchors having a spring ring at the front end of the expansion body.

EP0515916 A2 and DE3411285 A1 describe fasteners. In both cases, sleeves interlock with inner bolts via toothings.

SUMMARY OF THE INVENTION

It is an object of the present invention to provide an expansion anchor, in particular for concrete, that has particularly high performance, whilst being easy to manufacture.

The present invention provides an expansion anchor having an anchor bolt (10),
an expansion sleeve (30) surrounding the anchor bolt (10), and an expansion body (12) located in a front region of the anchor bolt (10), wherein the expansion body (12) has a converging zone (23) for expanding the expansion sleeve (30), and wherein the expansion body (12) is provided with at least one expansion body recess (66), characterized in that the at least one expansion body recess (66) is delimited by an expansion sleeve abutment wall (60), and the at least one expansion body recess (66) has a nonaxisymmetric cross-section.

An inventive anchor is characterized in that the at least one expansion body recess is, in particular at its front end, delimited by an expansion sleeve abutment wall, and the at least one expansion body recess has a nonaxisymmetric cross-section.

A first basic idea of the present invention may be seen in providing the expansion body with at least one expansion sleeve abutment wall, which expansion sleeve abutment wall faces the expansion sleeve before installation of the anchor, so that the expansion sleeve can hit the expansion sleeve abutment wall when the expansion body moves along the expansion sleeve during expansion of the expansion sleeve, when the anchor is installed. It has been discovered that this can improve anchor performance. The following mechanism can explain the observed improvement: When the tip of the expansion sleeve touches the expansion sleeve abutment wall, a temporary form fit can be generated between the expansion sleeve and the expansion body. This form fit can increase the resistance against pull-out of the expansion body out of the expansion sleeve, but it can do so without significant additional expansion of the expansion sleeve, i.e. without increasing the expansion force significantly. Due to the low expansion force, the substrate that surrounds the anchor, e.g. concrete, will not be overstressed, whereas the pull-out loads remarkably increase. Thus, due to the interlock between expansion sleeve abutment wall and expansion sleeve, concrete capacity can increase significantly above the level of standard expansion anchors. Moreover, since the interlock between expansion sleeve abutment wall and expansion sleeve can reduce relative movement between expansion sleeve and expansion body, the total anchor displacement behavior, in particular in cyclic load cracked concrete conditions, can also be improved.

A second basic idea of the invention might be seen in providing the expansion sleeve abutment wall at the end, in particular at the front end, of a recess in the expansion body. In other words, the expansion sleeve abutment wall forms the front-end wall of a recess. This can have a number of advantages: a) a recess can be particularly easy to manufacture, b) a wall formed at the end of a recess, i.e. an at least partly sunken wall, can be particularly robust, c) an at least partly sunken wall is less prone to undesired interference with the expansion mechanism or with the hole wall, and d) the recess can have additional preferable functions, amongst others substrate stress relieve. In particular, it has been found that if the recess is so designed that the expansion sleeve enters the recess upon being moved forwards relative to the expansion body, in particular by bending-in, pressure or, in particular, pressure-spikes on the substrate can be reduced. Since the expansion sleeve abutment wall is located at the end of the recess, this pressure relief is "automatically" coordinated with the activation of the expansion sleeve abutment wall, which can further improve performance without much effort. Thus, the anchor is preferably so configured that the expansion body recess receives a section of the expansion sleeve, in particular when the expansion body is moved rearwards relatively to the expansion sleeve, and/or when the expansion sleeve is expanded by the expansion body, in particular by bending-in. Since the size of the recess is finite, only a part of the expansion sleeve gets into to the recess, whereas the other part of the expansion sleeve expands fully along the expansion body surface. Thus, concrete stress is reduced without significantly reducing expansion rate.

Another basic idea of the invention is based on the finding that some sleeve abutment walls provided at the end of expansion body recesses performed below expectation. It was found that this was due to the side walls of the expansion body recess, i.e. those walls that limit the recess in the circumferential direction, being too steep to allow the expansion sleeve to efficiently bent into the recesses, leading to incomplete expansion sleeve engagement at the sleeve abutment walls. To overcome this effect, the invention proposes to shape the expansion body recess so that it has a nonaxisymmetric cross-section, in particular nonaxisymmetric, with respect to the radii of the anchor bolt, cross-section. In other words, the cross-section does not have axial symmetry, in particular with respect to the radii of the anchor bolt as the symmetry axis. This allows to provide one of the expansion body recess side walls with a very small inclination, i.e. to provide it with only little steepness, which in term allows efficient bending-in and therefore efficient expansion sleeve abutment wall engagement even when a stiff expansion sleeve is used. Thus, reliable expansion sleeve engagement and therefore particularly good performance can be achieved with little constructional effort.

Moreover, the inventive nonaxisymmetric cross-section of the expansion body recess allows to provide the other expansion body recess side wall with a steep and correspondingly narrow configuration. In this case, the expansion sleeve can be so positioned that a slit of the expansion sleeve overlaps this other expansion body recess side wall in the circumferential direction. As a consequence, no bending of the expansion sleeve will be required at this other expansion body recess side wall. With such a configuration, manufacturing can be further facilitated, since the steeper expansion body recess side wall does not have to contribute to the expansion sleeve expansion process and thus, the demands on manufacturing quality on this wall can be comparatively low In addition to these effects, the proposed asymmetric design of the expansion body recess can provide, in an easy-to-manufacture manner, particularly in a cold forming process, other advantageous effects, such as an easy-catching rotation prevention mechanism.

Preferably, the at least one expansion body recess has a nonaxisymmetric cross-section, in particular nonaxisymmetric with respect to the radii of the anchor bolt cross-section, in an axially extending zone, i.e. the nonaxisymmetric shape is present in a plurality of adjacent, axially spaced cross-section layers. The axial extension allows particularly efficient bending-in of the expansion sleeve.

The anchor bolt is an elongate body. The expansion body and the anchor bolt are, in particular, connected to transfer tensile forces. The expansion body can for example be threaded to the anchor bolt, in particular if the expansion anchor is a so-called sleeve-type expansion anchor. The expansion body can also be tightly fixed to the anchor bolt, in particular if the expansion anchor is a so-called stud-type expansion anchor. It is particularly preferred in case of a stud-type expansion anchor that the expansion body and the anchor bolt are integral, i.e. that they form one piece. If the expansion anchor is a so-called stud-type expansion anchor, the anchor bolt is preferably provided with a forwardly-facing shoulder for expansion sleeve abutment and for advancing the expansion sleeve into the borehole.

The at least one expansion body recess is in particular provided on the lateral surface of the expansion body. In particular, the at least one expansion body recess extends radially into the expansion body. The at least one expansion body recess is preferably at least partly located in the converging zone of the expansion body.

The expansion sleeve surrounds the anchor bolt, in particular around the longitudinal axis. Preferably, the expansion sleeve is a single piece. However, it could also consist of several individual segments, which are for example held in a bolt-surrounding arrangement by means of a rubber band or by snap-on mechanisms.

Preferably, the anchor bolt, the expansion sleeve and/or the expansion body are each steel parts. They can for example comprise carbon steel or stainless steel.

The anchor bolt can have, in particular in a rear region of the anchor bolt, a tension-introducing structure. The tension-introducing structure is for introducing rearwardly-directed tensile force into the anchor bolt. The tension-introducing structure can for example be a thread, in particular an outer thread, provided on the anchor bolt. The tension-introducing structure can for example also be a head, that forms a maximum cross-section, or a bayonet-type lock.

The converging zone of the expansion body serves to expand the expansion sleeve when the expansion body is moved rearwards with respect to the expansion sleeve, in particular to expand the expansion sleeve radially with respect to the longitudinal axis. In the converging zone, the expansion body converges, on its lateral surface, towards the rear of the anchor bolt and/or towards the tension-introducing structure, wherein the focus of convergence can preferably be on the longitudinal axis. This can in particular imply that the radial distance of the lateral surface of the expansion body from the longitudinal axis becomes smaller towards the rear of the expansion body. The expansion body can have additional zones, for example a preferably cylindrical transition zone and/or a tip zone. The converging zone can for example be conical, or can have a more complex, for example a convex or concave shape. In particular, the converging zone forms a wedge for the expansion sleeve.

The expansion sleeve abutment wall is for creating an interlock between the expansion body and the expansion sleeve. The expansion sleeve abutment wall is so arranged that the expansion sleeve can hit the expansion sleeve abutment wall, i.e. that the expansion sleeve can abut on the expansion sleeve abutment wall, when the expansion body is axially displaced relative to the expansion sleeve in the rearwards direction, i.e. in the direction facing away from the front end of the expansion body and/or of the anchor bolt, in particular by drawing-in the expansion body into the expansion sleeve in the rearwards direction. Thus, the expansion sleeve abutment wall axially faces the expansion sleeve, or, in other words, the expansion sleeve abutment wall faces the expansion sleeve in a direction parallel to the longitudinal axis. Preferably, the expansion sleeve abutment wall faces, in particular axially faces, the tip of the expansion sleeve and/or serves for abutment of the tip of the expansion sleeve, and can therefore be named expansion sleeve tip abutment wall. The tip of the expansion sleeve can be understood to be the front end of the expansion sleeve, i.e. the end pointing in the forwards direction. The expansion sleeve abutment wall is arranged vis-à-vis, in particularly axially vis-à-vis, the expansion sleeve, and particularly the tip of the expansion sleeve. In particular, the expansion sleeve abutment wall faces, more particularly axially faces, the expansion sleeve in a state before the expansion sleeve is expanded by the expansion body, i.e. in the pre-installation state of the anchor, before the anchor is installed. In particular, the expansion sleeve abutment wall faces the rear of the anchor.

The inventive anchor is so configured that the expansion sleeve, in particular with its tip, can hit the at least one expansion sleeve abutment wall during axial displacement of the expansion body relative to the expansion sleeve in the rearwards direction and/or during radial expansion of the expansion sleeve by the expansion body. Thus the at least one expansion sleeve abutment wall is suitable and/or configured for being abutted on by the expansion sleeve, in particular axially and/or by the tip of the expansion sleeve. In particular, the at least one expansion sleeve abutment wall is suitable and/or configured for being abutted on, in particular axially abutted on, by a section, in particular a front-end section, of the expansion sleeve, which section is curved around the longitudinal axis and/or designated to be radially displaced by the expansion body.

In particular, a step structure is formed at the expansion sleeve abutment wall, wherein the expansion sleeve abutment wall forms the riser of the respective step structure. The expansion sleeve abutment wall is arranged on the lateral surface of the expansion body.

The at least one expansion sleeve abutment wall might be straight in side view of the anchor bolt, permitting a simple structural design. However, the at least one expansion sleeve abutment wall may also be curved in side view of the anchor bolt, or it may, in side view of the anchor bolt, consist of several wall segments, for example straight wall segments, that are connected in an angled relationship to give a single expansion sleeve abutment wall. In particular, the at least one expansion sleeve abutment wall may form a concavity in side view of the anchor bolt, which might be advantageous from a manufacturing point of view. Due to the nonaxisymmetric cross-section of the expansion body recess, the radial height of the expansion sleeve abutment wall relative to its wall base can vary.

Where the term "longitudinal axis" is used, this should, in particular, refer to the longitudinal axis of the anchor bolt, which is often also the longitudinal axis of the expansion anchor. In accordance with the usual definition, the "longitudinal axis" can in particular be the axis that runs in the longitudinal direction, i.e. in the long direction of the elongate anchor bolt. Where the terms "radially", "axially" or "circumferentially" are used, this should in particular be understood with respect to the longitudinal axis of the anchor bolt.

Advantageously, the at least one expansion body recess has, in particular in cross-section, a first expansion body recess side wall and a second expansion body recess side wall. This allows to manufacture the inventive nonaxisymmetric cross-section in a particularly easy way. The expansion body recess side walls can delimit the expansion body recess in the circumferential direction. Preferably, both expansion body recess side walls meet in an apex.

Preferably, the first expansion body recess side wall is steeper than the second expansion body recess side wall, in particular in cross-section. The fact that a wall is steeper can, in particular, imply, that this wall has, in cross-section, a tangent that is closer to the longitudinal axis of the anchor bolt and/or more similar to a radial line than the other wall. Having differently steep walls can further improve manufacturing, in particular of the nonaxisymmetric cross-section of the expansion body recess. The second expansion body recess side wall is preferably wider, in the circumferential direction, that the first expansion body recess side wall.

The second expansion body recess side wall is, advantageously, curved, in particular convexly curved, in cross-section. This in particular implies that the expansion body projects convexly at the second expansion body recess side wall. A convexly curved wall can further facilitate manufacturing, in particular by rolling, and/or can provide a particularly stable force distribution.

The expansion sleeve can have at least one slit, originating from the front end of the expansion sleeve. The slit can be due to manufacturing reasons, in particular if the expansion sleeve is manufactured by bending a sheet material around the anchor bolt. Alternatively or additionally, the at least one slit can be provided for assisting expansion of the expansion sleeve. Preferably, the expansion sleeve has a plurality of slits originating from the front end of the expansion sleeve, and the expansion sleeve has fingers between neighboring slits.

Advantageously, the at least one slit is in a position overlapping the first expansion body recess side wall or can at least be brought into this position by rotating the expansion sleeve around the anchor bolt, in particular nondestructively, i.e. without destroying the anchor. In the position overlapping the first expansion body recess side wall, the slit is located radially above the first expansion body recess side wall. Positioning the slit so that it overlaps the—preferably steeper—first expansion body recess side wall when the anchor is installed can further facilitate the bending of the expansion sleeve into the expansion body recess, since in this position, the expansion sleeve does not have to bend around the steep structure, which avoids small bending radii. This, in term, can further improve the interlocking of the expansion sleeve with the expansion sleeve abutment wall, thus further improving anchor performance. Moreover, having the slit in said position overlapping with the first expansion body recess side wall can also provide particularly effective rotation prevention between the expansion sleeve and the expansion body.

If there is a plurality of expansion body recesses and a plurality of slits originating from the front end of the expansion sleeve, it is particularly preferred, for the same reasons, if each of the first expansion body recess side walls of the expansion body recesses has an associated slit that is in a position overlapping said first expansion body recess side wall or can at least be brought into this position by rotating the expansion sleeve around the anchor bolt, in particular nondestructively. This permits particularly effective bending-in of the expansion sleeve at each expansion body recess. Preferably, the number of slits is equal or greater than the number of expansion body recesses, which allows efficient bending-in and a particularly simple design.

Preferably, the expansion anchor has a rotational lock for holding the at least one slit in the position overlapping the first expansion body recess side wall. This allows particularly good operation even in adverse conditions.

The anchor bolt preferably has a neck located adjacent to the expansion body. The neck can accommodate the expansion sleeve before the anchor is installed. The neck is in particular positioned rearwards of the converging zone.

Advantageously, the neck is provided with at least one neck recess and the expansion sleeve engages in the neck recess. Amongst others, this can provide rotation prevention in a particularly easy-to-manufacture and reliable manner. The above-mentioned rotational lock can therefore comprise the neck and the expansion sleeve engaging the neck. Moreover, the neck recess can accommodate expansion sleeve material that is radially displaceable by the expansion body when loading the anchor, i.e. which material can be activated as described in EP2848825 A1, which can further improve anchor performance. The at least one neck recess is in particular provided on the lateral surface of the neck. In particular, the at least one neck recess extends radially into the neck. The at least one neck recess is preferably a groove extending in the axial direction, in particular parallel to the longitudinal axis.

It is particularly preferred if the at least one neck recess circumferentially overlaps the at least one expansion body recess. This can, in particular, imply that the two recesses are arranged axially one behind the other. Due to this overlap, the expansion sleeve material engaging the neck recess can enter the expansion body recess when loading the anchor, in particular during installation. This, advantageously, provides further scope for design. In particular, the above-mentioned activation of the expansion sleeve material can be achieved at an expansion body recess side wall, preferably at the second expansion body recess side wall.

The at least one neck recess has preferably nonaxisymmetric cross-section, in particular nonaxisymmetric with respect to the radii of the anchor bolt cross-section. This, advantageously, provides further scope for design. In particular, the at least one neck recess can have nonaxisymmetric cross-section, in particular nonaxisymmetric with respect to the radii of the anchor bolt cross-section, in an axially extending zone, i.e. the nonaxisymmetric shape is present in a plurality of adjacent, axially spaced cross-section layers.

Advantageously, the at least one neck recess has, in particular in cross-section, a first neck recess side wall and a second neck recess side wall. This allows to manufacture the inventive nonaxisymmetric cross-section in a particularly easy way. The neck recess side walls can delimit the neck recess in the circumferential direction. Preferably, both neck recess side walls meet in an apex.

Preferably, the second neck recess side wall is steeper than the first neck recess side wall, in particular in cross-section. Again, the fact that a wall is steeper can, in particular, imply, that this wall has, in cross-section, a tangent that is closer to the longitudinal axis of the anchor bolt and/or more similar to a radial line than the other wall. Having differently steep walls can further improve manufacturing, in particular of the nonaxisymmetric cross-section of the abutment wall. The first neck recess side wall is preferably wider, in the circumferential direction, that the second neck recess side wall.

The anchor can be so designed that the first neck recess side wall circumferentially overlaps the first expansion body recess side wall, and/or the second neck recess side wall circumferentially overlaps the second expansion body recess side wall. According to this embodiment, the neck recess can have an inverse orientation when compared to the expansion body recess located in front of the neck recess. This can allow particularly efficient activation of expansion sleeve material upon anchor loading whilst being easy to design and manufacture.

The first neck recess side wall is, advantageously, curved, in particular convexly curved, in cross-section. This in particular implies that the neck projects convexly at the first neck recess side wall. A convexly curved wall can further facilitate manufacturing, in particular by rolling, and/or can provide a particularly good force distribution.

As already mentioned above, the anchor bolt can have thread, in particular an outer thread. This thread can be used for introducing rearwardly directed tensile force into the anchor bolt. Preferably, a nut is screwed onto the thread, which nut can hold parts attached by the anchor. The thread defines a fastening direction, i.e. a direction in which a fastener, such as a nut, needs to be rotated in order to be screwed onto the anchor bolt, in particular in the forwards direction.

Preferably, the second neck recess side wall faces in the fastening direction. In other words, the—preferably steeper—second neck recess side wall forms a leading flank with respect to the fastening direction, and the first neck recess side wall forms a trailing flank with respect to the fastening direction. This can efficiently prevent premature expansion of the expansion sleeve by the neck recess side walls when a fastener is screwed onto the thread during anchor installation and torque directed in the fastening direction is imparted on the anchor bolt. In this case, the relatively steep second neck recess side wall acts on the expansion sleeve, and the steep design of the second neck recess side wall leads to relatively low radial expansion forces. In other words, the installation torque can efficiently push to rotate the expansion sleeve but will not push the sleeve to significantly expand.

It can also be advantageous that the second expansion body recess faces in the fastening direction.

As explained in more detail above, the axial form fit interlock between the expansion sleeve and the expansion body, generated by the at least one expansion sleeve abutment wall, can advantageously improve anchor performance. In addition to this, it was discovered that it can be particularly advantageous when the form fit interlock between the expansion sleeve and the expansion body generated by the at least one expansion sleeve abutment wall is significant, but not too strong. In other words, it is advantageous when the expansion sleeve abutment wall only "brakes" the expansion sleeve, without completely stopping it, i.e. when the expansion sleeve abutment wall can be surmounted by the expansion sleeve, on purpose and in particular without destroying the anchor. In particular, it was discovered that a complete stop of the expansion sleeve could lead to pull-out type of failure at excessive loads, which is an often undesired pattern. This could be explained by a change of anchor characteristics from expansion-type to frictional-type when a hard stopping expansion sleeve abutment wall is hit by the expansion sleeve. In contrast, if the expansion sleeve abutment wall is designed to be surmounted by the expansion sleeve, the anchor characteristics can, at least partly, revert to expansion-type at high loads, which allows to activate expansion reserves at the expansion sleeve so that maximum load capacity can be further increased, preferably up to concrete cone failure. Thus, having the expansion sleeve abutment wall surmountable by the expansion sleeve can create a particularly long and smooth force-displacement characteristic of the anchor.

In view of the above, it is particularly advantageous if the at least one expansion sleeve abutment wall is designed for surmountably obstructing the expansion sleeve, in particularly for surmountably obstructing axial movement of the expansion sleeve. This can preferably be achieved by a gradual change of the depth of the expansion sleeve abutment wall. "Obstructing" implies here that an interlock can be created, "surmountably" that the interlock can be, on purpose, overcome, in particular at high loads. Such a surmountable obstruction can for example be created by having the expansion sleeve tip or/and the expansion sleeve abutment wall slanted along the axial direction, so that the expansion sleeve abutting on the expansion sleeve abutment wall is pushed radially outwards at high axial loads by a wedge effect, until the expansion sleeve can axially surmount the expansion sleeve abutment wall.

It is particularly advantageous if the least one expansion sleeve abutment wall tapers towards the rear of the anchor bolt. Thus, preferably, the expansion sleeve abutment wall is, at least in total, non-perpendicular to the longitudinal axis. Rather, the radius of the expansion body gradually decreases towards the rear of the anchor bolt at the expansion sleeve abutment wall. This allows creating a surmountable obstruction in a particularly reliable and easy-to-manufacture way. Preferably, the maximum slope $\alpha_{max}$ of the at least one expansion sleeve abutment wall, measured with respect to the longitudinal axis of the anchor bolt, is smaller than 80° or 70°, which means that no point of the expansion sleeve abutment wall has larger slope. It has been observed that at higher angles, the interlock might be too tight for certain situations. In accordance with usual definition, the slope measured with respect to the longitudinal axis can in particular be understood to be the angle between a tangent line at a point of the wall and the longitudinal axis, measure in a longitudinal plane, i.e. in a plane that contains the longitudinal axis.

Also, preferably, the maximum slope $\alpha_{max}$ of the at least one expansion sleeve abutment wall, measured with respect to the longitudinal axis of the anchor bolt, is greater than 30°. Having this lower boundary for the slope ensures particularly reliable interlock and can maximize capacity in a particularly simple way.

The expansion body can have, located in front of the converging zone, a transition zone. In such a transition zone, the convergence of the expansion body is at least less steep as compared with the converging zone, or the convergence can be completely absent. Such a transition zone can prevent over-expanding the expansion sleeve and over-stressing the surrounding substrate at high loads. If convergence is completely absent, the transition zone can have a cylindrical lateral surface, wherein cylindrical is to be understood in a broad definition, in which the cylinder base can be, but does not necessarily has to be, circular.

The at least one expansion sleeve abutment wall is preferably located relatively far forward on the expansion body, so that the interlock with the expansion sleeve is only then generated when the expansion sleeve is already safely anchored. Therefore, premature pullout can be efficiently avoided and concrete usage can be improved. If a transition zone is provided, the at least one expansion sleeve abutment wall can preferably be located close to or within the transition zone. This can result in a particularly well-coordinated activation of the expansion sleeve abutment wall and therefore particularly good load characteristics. In particular, the expansion sleeve abutment wall will in this case not be engaged by the expansion sleeve before a late expansion phase, in which the expansion sleeve is already safely anchored and increase of pressure on the substrate is relatively low. In this phase, the contribution of the interlock can be particularly efficient. Thus, concrete usage can be further improved.

Preferably, the expansion body has an arcuate cross-section adjacent to the at least one expansion body recess. This can allow a particular uniform loading of the substrate. In accordance with the usual definition, a cross-section is meant to be a section perpendicular to the longitudinal axis.

It is particularly preferred if the expansion body has a plurality of expansion body recesses, each expansion body recess being delimited, in particular at its respective front end, by an expansion sleeve abutment wall. Thus, there is also a plurality of expansion sleeve abutment walls. This allows to achieve the advantages described above in context with a single expansion sleeve abutment wall in a multi-wall setup, wherein the provision of several expansion sleeve abutment walls can increase their performance and ease of use. Preferably, there are provided minimum 2 or minimum 3 expansion body recesses and expansion sleeve abutment walls. Having a plurality of expansion sleeve abutment walls can provide for a particularly uniform load distribution and therefore, whilst being easy to manufacture, for a particularly reliable interlock of the expansion sleeve. Moreover, it can avoid peak loads at the anchor and/or the surrounding concrete, thereby further improving performance. Moreover, it can facilitate the design of advantageous axially free sleeve regions, which can further improve performance at low costs. The individual expansion sleeve abutment walls are, in particular, separate and/or distinguishable from another.

In this text, reference is repeatedly made to the properties of "at least one expansion body recess". If, according to the invention, there is provided a plurality of expansion body recesses, then at least one of the plurality of expansion body recesses can have these properties, or all of the plurality of expansion body recesses can have these properties, unless explicitly stated otherwise. Also, in this text, reference is repeatedly made to the properties of "at least one expansion sleeve abutment wall". If, according to the invention, there is provided a plurality of expansion sleeve abutment walls, then at least one of the plurality of expansion sleeve abutment walls can have these properties, or all of the plurality of expansion sleeve abutment walls can have these properties, unless explicitly stated otherwise.

It is particularly preferred that the expansion sleeve abutment walls are arranged abreast, i.e. that they overlap in the axial direction. Preferably, there is at least on plane perpendicular to the longitudinal axis that intersects all expansion sleeve abutment walls. This allows for a particularly well-coordinated and therefore efficient interlock with easy-to-manufacture sleeve structures.

It is particularly advantageous if the expansion body has maximum of 8, preferably maximum 6, particularly preferable maximum 4, expansion sleeve abutment walls. Thus, there is relatively few expansion sleeve abutment walls and also relatively few expansion body recesses. This allows to design the respective expansion sleeve abutment walls and the expansion body recesses particularly effective in a particularly easy way. In particular, since there are only few elements, they can be made relatively broad without requiring complex designs. Broad expansion sleeve abutment walls, in turn, allow effective interlock and broad expansion body recesses allow effective expansion sleeve bending-in. It is especially preferred that the expansion body is provided with 3 or 4 expansion body recesses, each being delimited by an expansion sleeve abutment wall, i.e. that there are 3 or 4 expansion sleeve abutment walls.

Preferentially, the expansion sleeve abutment walls are arranged in a rotationally symmetric manner on the anchor bolt, the expansion sleeve abutment walls are arranged equidistantly around the expansion body, and/or the expansion sleeve abutment walls all have equal widths, all within usual manufacturing tolerances. Such symmetric setups can improve load balance, and can therefore further improve performance.

Preferentially, the converging zone of the expansion body has an apex angle β between 10° and 40, particularly between 26° and 40°. If the apex angle β is larger, there is an increased probability of the effect of the steep expansion sleeve abutment wall being masked by the already steep converging zone. If it is smaller, substrate loading would be high, even when there is interlock at the expansion sleeve abutment wall.

Preferably, the maximum diameter of the anchor bolt and/or the expansion body is less than 30 mm or 25 mm. The invention can be particularly useful for relatively small anchors.

The invention also relates to a method for using, in particular for installing, an inventive expansion anchor, in which the expansion body is moved rearwardly relative to the expansion sleeve, in particular to expand the expansion sleeve, wherein the expansion sleeve hits the at least one expansion sleeve abutment wall. In particular, the invention also relates to a method for using, in particular for installing, an inventive expansion anchor, in which the anchor is inserted into a hole, and the expansion body is, with the anchor located in the hole, in particular with at least the tip of the expansion sleeve located in the hole, moved rearwards relative to the expansion sleeve, wherein the expansion sleeve hits the at least one expansion sleeve abutment wall. Accordingly, the anchor is used and/or installed as intended. Moving the expansion body rearwards relative to the expansion sleeve can preferably be achieved by pulling the anchor bolt, with the expansion body attached, out of the hole or/and by moving the expansion body rearwards relative to the anchor bolt.

It is advantageous if the expansion body is moved rearwards relative to the expansion sleeve, wherein a region of the expansion sleeve is inserted into the at least one expansion body recess.

Features which are described here in context with the expansion anchor can also be used for the method for using the expansion anchor, and features that are described here in context with the method for using the expansion anchor can also be used for the expansion anchor itself.

BRIEF DESCRIPTION OF THE DRAWINGS

The invention is explained in greater detail below with reference to preferred exemplary embodiments, which are depicted schematically in the accompanying drawing, where individual features of the exemplary embodiments presented below can be implemented either individually or in any combination within the scope of the present invention.

FIG. 5: a first perspective view of the anchor bolt of the expansion anchor of FIG. 1;

FIG. 6: a second perspective view of the anchor bolt of the expansion anchor of FIG. 1;

FIG. 7: an enlarged side view of the front region, i.e. of the tip region, of the expansion anchor of FIG. 1;

FIG. 8: a cross section C-C, according to FIG. 7, of the expansion anchor of FIG. 1;

FIG. 9: a cross section D-D, according to FIG. 7, of the expansion anchor of FIG. 1;

DETAILED DESCRIPTION

The figures show an embodiment of an inventive expansion anchor. The expansion anchor comprises an elongate anchor bolt 10 defining a longitudinal axis 99 (see, e.g., FIG. 10), an expansion sleeve 30, which surrounds the anchor bolt 10, and an expansion body 12 for the expansion sleeve 30 provided on the anchor bolt 10, namely in the vicinity of the front end of the anchor bolt 10.

Figure 2:
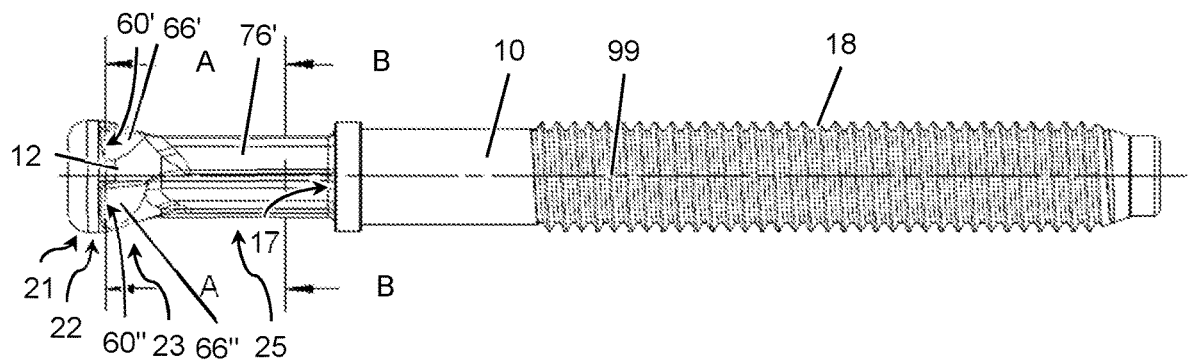
FIG. 2: a side view of the anchor bolt of the expansion anchor of FIG. 1.
Figure 11:
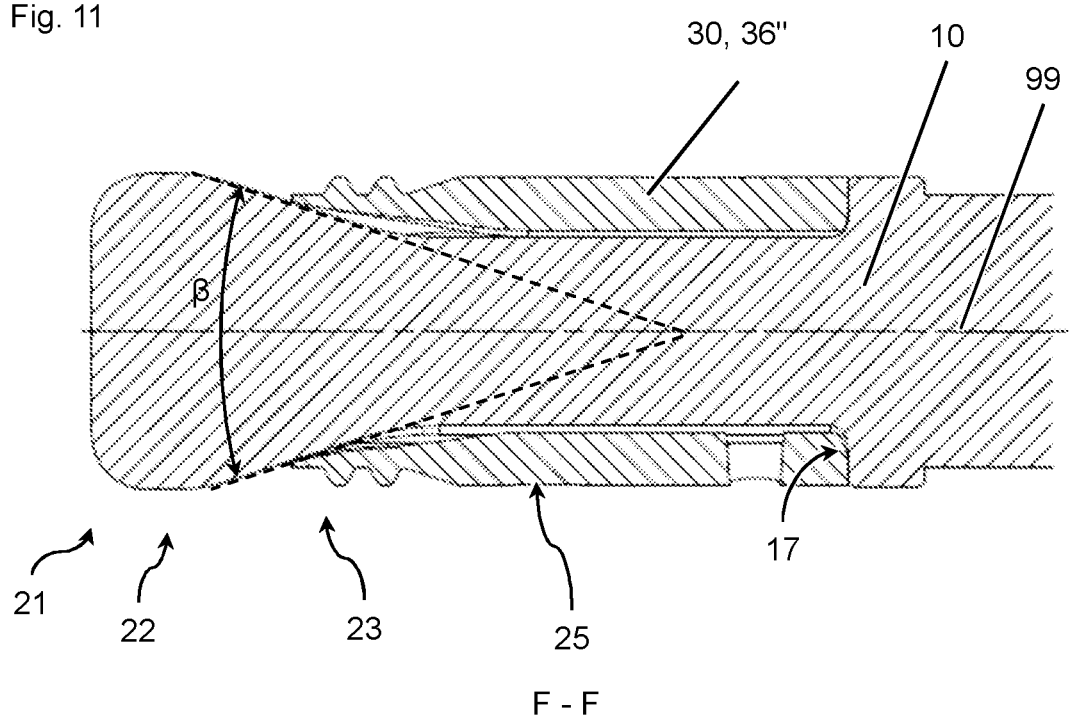
FIG. 11: a longitudinal section F-F, according to FIG. 8, of the expansion anchor of FIG. 1.
Figure 12:
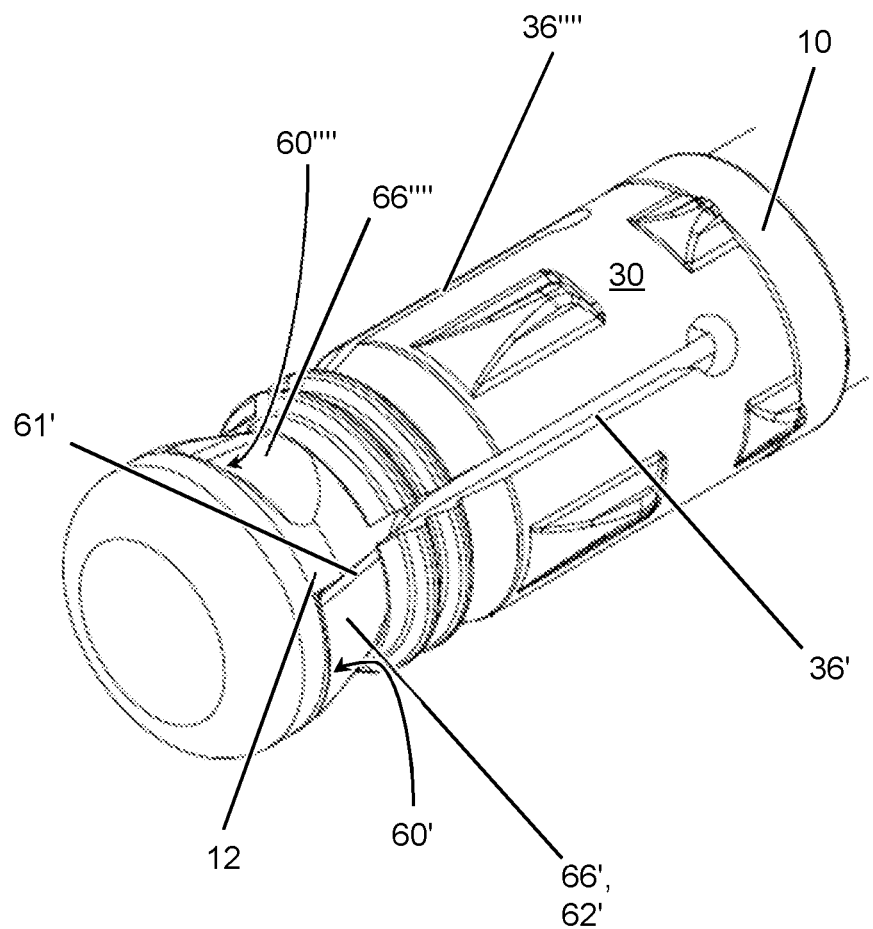
FIG. 12: an enlarged perspective view of the front region, i.e. of the tip region, of the expansion anchor of FIG. 1.

As shown in particular in FIGS. 2 and 11, the expansion body 12 has a converging zone 23 designed for radially expanding the expansion sleeve 30 when the expansion body 12 is drawn into the expansion sleeve 30 in the rearwards direction, i.e. when the expansion sleeve 30 is moved forwards relative to the expansion body 12 onto the expansion body 12. For this purpose, the lateral surface of the expansion body 12 converges in the converging zone 23 towards the rear of the anchor, i.e. it converges towards the expansion sleeve 30 at least before the anchor is installed. In the present example, the expansion body 12 lateral surface is conical in the converging zone 23, with a focus of convergence on the longitudinal axis 99 and with apex angle β shown in FIG. 11. However, this is merely an example and other converging designs are also possible.

In the present example, the expansion body 12 also has a transition zone 22, which is located forwards of and adjacent to the converging zone 23, and a tip zone 21, which is located forwards of and adjacent to the transition zone 22. In the transition zone 22, the rearward convergence is smaller as compared to the converging zone 23 or the rearward convergence is even zero, but preferably not reverse, i.e. it is not a forward convergence. In the present example, convergence is absent, i.e. zero, in the converging zone 23 and the expansion body 12 has a cylindrical lateral surface in the converging zone 23, in particular cylindrical with a circular base. In the tip zone 21, the lateral surface of the expansion body 12 converges towards the front end of the anchor.

The anchor bolt 10 has a neck 25, which is located adjacent to and rearwards of the expansion body 12. The expansion sleeve 30 at least partly surrounds this neck 25, at least before installation the anchor. At the neck 25, the diameter of the anchor bolt 10 can be minimal.

In the present embodiment, the anchor is of the stud type. The anchor bolt 10 has, at the rearward end of the neck 25, a shoulder 17 facing forwards for axially engaging the expansion sleeve 30 and for advancing the expansion sleeve 30 forwards. In the present case, the expansion body 12 is, by way of example, integral with the anchor bolt 10.

In a rear region of the anchor bolt 10, the anchor bolt 10 is provided with an outer thread 18, which provides a tension-introducing structure for introducing rearwardly-directed tension into the anchor bolt 10. The thread 18 defines a fastening direction, which is shown as a dashed arrow in FIG. 1. The fastening direction is the direction in which a nut 8 that is located on the thread 18 needs to be rotated in order to advance the nut 8 towards the tip of the anchor bolt 10. In case of the shown embodiment, it is a right-handed direction.

The expansion sleeve 30 is provided with a plurality of slits 36', 36", 36'", 36"", (see, e.g., FIG. 9) which originate from the front end of the expansion sleeve 30 and extend towards the rear end of the expansion sleeve 30. The slits 36', 36", 36'", 36"" facilitate radial expansion of the expansion sleeve 30.

Figure 3:
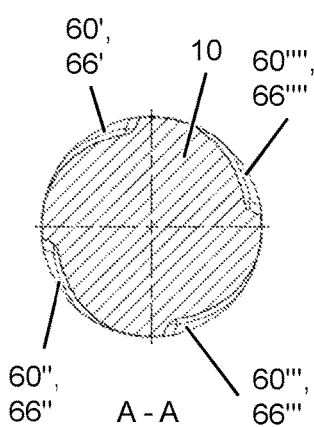
FIG. 3: a cross section A-A, according to FIG. 2, of the anchor bolt of the expansion anchor of FIG. 1.

On the lateral surface of the expansion body 12 is provided a plurality of expansion body recesses 66', 66", 66'", 66"" (exemplarily four in the present case, but a different number can also be provided, see, e.g., FIG. 3). These expansion body recesses 66', 66", 66'", 66"" are radially accessible from the outside of the expansion body 12. Due to their shape explained in detail further below, they each have a roughly triangular contour when seen in side view. Other contours are possible, however. In cross-section, the expansion body 12 deviates from a circle at the expansion body recesses 66', 66", 66'", 66"".

Each of the expansion body recesses 66', 66", 66'", 66"" is terminated at its front end by an expansion sleeve abutment wall 60', 60", 60'", 60"", respectively. As there are four expansion body recesses 66', 66", 66'", 66"" in the present example, there are also four expansion sleeve abutment walls 60', 60", 60'", 60"". Each of these expansion sleeve abutment walls 60', 60", 60'", 60"" faces the expansion sleeve 30, i.e. faces rearwardly, and forms a surmountable axial stop for the front end, i.e. for the tip, of the expansion sleeve 30.

Figure 10:
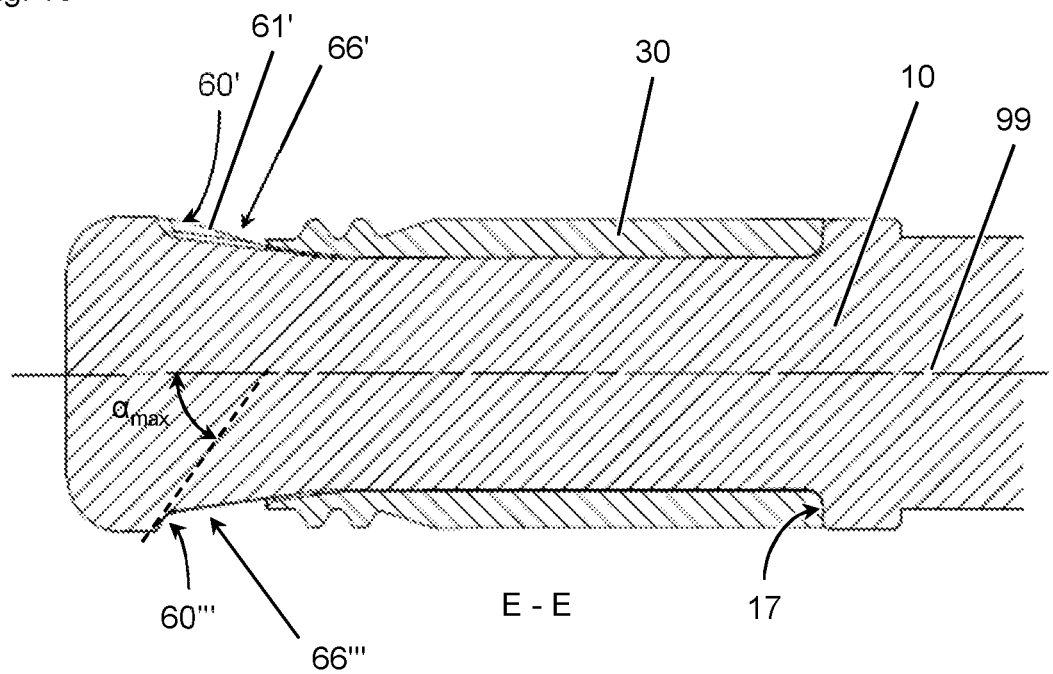
FIG. 10: a longitudinal section E-E, according to FIG. 8, of the expansion anchor of FIG. 1.

As shown in FIG. 10 and, by way of example, at expansion sleeve abutment wall 60'", each of the expansion sleeve abutment walls 60', 60", 60'", 60"" has a maximum slope $\alpha_{max}$, measured longitudinally with respect to the longitudinal axis 99. The expansion sleeve abutment walls 60', 60", 60'", 60"" are located abreast, located at the same position along the longitudinal axis 99, and do not overlap in the circumferential direction. The expansion sleeve abutment walls 60', 60", 60'", 60"" are all located in the converging zone 23, immediately rearwards of the transition zone 22.

Each of the expansion body recesses 66', 66", 66'", 66"" has a first expansion body recess side wall and a second expansion body recess side wall, wherein the two expansion body recess side walls delimit the respective expansion body recess 66', 66", 66'", 66"" in the circumferential direction. Thus, the expansion body recess side walls are circumferential side walls. In case of expansion body recess 66', the first expansion body recess side wall has been marked with reference numeral 61' and the second expansion body recess side wall has been marked with reference numeral 62', respectively. The expansion body recess side walls of the remaining expansion body recesses 66", 66'", 66"" are in analogy to those of expansion body recess 66', but have not been provided with reference numerals for the sake of clarity.

Figure 1:
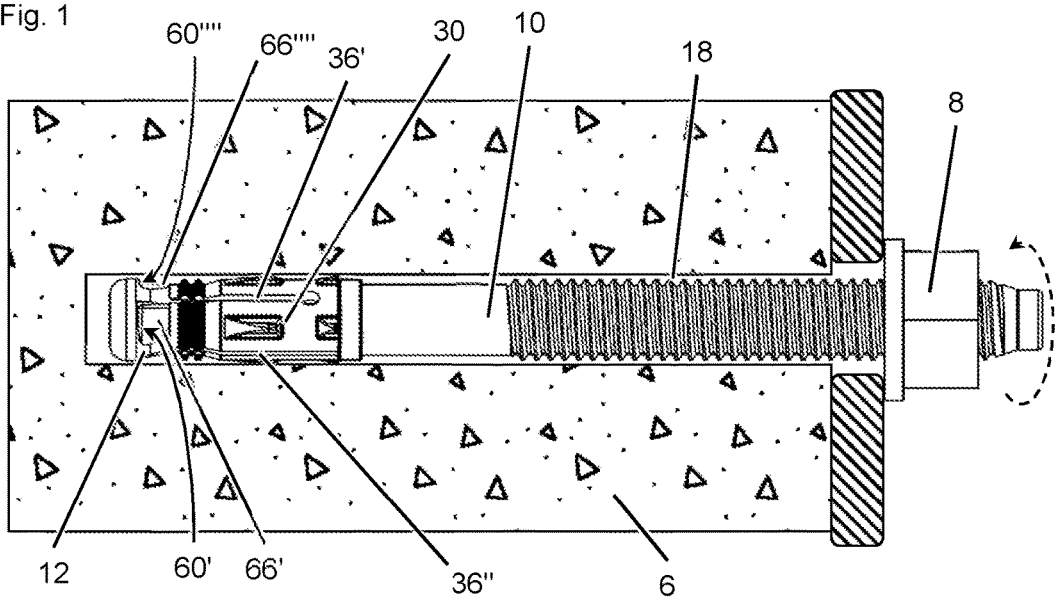
FIG. 1: a side view of an inventive expansion anchor located in a concrete substrate.

The first expansion body recess side wall 61' forms a trailing flank with respect to the fastening direction of the thread 18, and it is located upstream of the second expansion body recess side wall 62' of the respective expansion body recess 66', 66", 66'", 66"" in the fastening direction of the thread 18, i.e. in the direction shown with a dashed arrow in FIG. 1. The second expansion body recess side wall 62' thus forms a leading flank with respect to the fastening direction of the thread 18 and faces in the fastening direction of the thread 18. At each of the expansion body recesses 66', 66", 66'", 66"", the respective first expansion body recess side wall 61' meets the respective second expansion body recess side wall 62', thereby forming an apex. At each of the expansion body recesses 66', 66", 66'", 66"", the respective second expansion body recess side wall 62' is convexly curved in cross section, as can be seen particularly well in FIG. 8.

At each of the expansion body recesses 66', 66", 66'", 66"", the respective first expansion body recess side wall 61' is steeper (i.e. closer to a radial plane originating from the longitudinal axis 99) than the respective second expansion body recess side wall 62' in cross section. Consequently, each of the expansion body recesses 66', 66", 66'", 66"" has a nonaxisymmetric cross-section. Since expansion body 12 has circular cross-section forwards of the expansion body recesses 66', 66", 66'", 66"", this design results in the sleeve abutment walls 60', 60", 60'", 60"" each having nonaxisymmetric cross-section, as can be seen particularly well in FIG. 8. In particularly, the depth of each of the expansion sleeve abutment walls 60', 60", 60'", 60"" increases in a shallow manner and decreases in a steep manner when seen circumferentially in the fastening direction.

Figure 4:
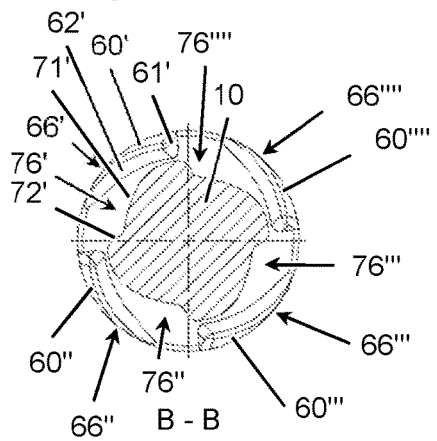
FIG. 4: a cross section B-B, according to FIG. 2, of the anchor bolt of the expansion anchor of FIG. 1.

On the lateral surface of the neck 25 is provided a plurality of neck recesses 76', 76", 76'", 76"" (exemplarily four in the present case, but a different number can be also provided). These neck recesses 76', 76", 76'", 76"" are radially accessible from the outside of the anchor bolt 10. The neck recesses 76', 76", 76'", 76"" are longitudinal grooves each, extending parallel to the longitudinal axis 99. In cross-section, the neck 25 deviates from a circle at the neck recesses 76', 76", 76'", 76"". Each of the neck recesses 76', 76", 76'", 76"" overlaps one of expansion body recesses 66', 66", 66'", 66"" and one of the expansion sleeve abutment walls 60', 60", 60'", 60"" in the circumferential direction, which is particularly well visible in FIG. 4. In particular, recess 76' circumferentially overlaps recess 66' and overlaps wall 60', recess 76" overlaps recess 66" and wall 60", and so forth.

As can be seen particularly well in FIG. 9, the expansion sleeve 30 engages in the neck recesses 76', 76", 76'", 76"". For this purpose, the expansion sleeve has axially extending thickenings, which project into the neck recesses 76', 76", 76'", 76"". This engagement forms a rotational lock, which prevents rotating of the expansion sleeve 30 around the anchor bolt 10. In particular, the rotational lock locks the expansion sleeve 30 in a position in which each of the slits 36', 36", 36'", 36"" circumferentially overlaps one of the first expansion body recess side walls 61', so that each of the slits 36', 36", 36'", 36"" is located radially above one of the first expansion body recess side walls 61'.

Each of the neck recesses 76', 76", 76'", 76"" has a first neck recess side wall and a second neck recess side wall, wherein these two neck recess side walls limit the respective neck recess 76', 76", 76'", 76"" in the circumferential direction. Thus, the neck recess side walls are circumferential side walls. In case of neck recess 76', the first neck recess side wall has been marked with reference numeral 71' and the second neck recess side wall has been marked with reference numeral 72', respectively. The neck recess side walls of the remaining neck recesses 76", 76'", 76"" are in analogy to those of neck recess 76', but have not been provided with reference numerals for the sake of clarity.

The first neck recess side wall 71' forms a trailing flank with respect to the fastening direction of the thread 18, and it is located upstream of the second neck recess side wall 72' of the respective neck recess 76', 76", 76''', 76'''' in the fastening direction of the thread 18, i.e. in the direction shown with a dashed arrow in FIG. 1. The second neck recess side wall 72' thus forms a leading flank with respect to the fastening direction of the thread 18 and faces in the fastening direction of the thread 18. At each of the neck recesses 76', 76", 76''', 76'''', the respective first neck recess side wall 71' meets the respective second neck recess side wall 72', thereby forming an apex. At each of the neck recesses 76', 76", 76''', 76'''', the respective first neck recess side wall 71' is convexly curved in cross section. At each of the neck recesses 76', 76", 76''', 76'''', the respective second neck recess side wall 72' is, in cross section, steeper (i.e. closer to a radial plane originating from the longitudinal axis 99) than the respective first neck recess side wall 71'. All of this can be seen particularly well in FIG. 9.

When the anchor is installed, it is introduced, front end first, into a hole in a substrate 6. Subsequently, the expansion body 12 is drawn into the front-end region of the expansion sleeve 30, i.e. the expansion sleeve 30 is pushed forwards relatively to the expansion body 12 and over the expansion body 12. In the present embodiment, this is achieved by pulling the anchor bolt 10 together with the expansion body 12 rearwardly, in particular by tightening the nut 8 provided on the thread 18 of the anchor bolt 10 in the fastening direction. Since the substrate 6 exerts radial pressure on the expansion sleeve 30, the expansion sleeve 30 slightly bends radially into the expansion body recesses 66', 66", 66''', 66'''' when the expansion body 12 is drawn into the front-end region of the expansion sleeve 30. The nonaxisymmetric cross-section of the expansion body recesses 66', 66", 66''', 66'''' and the overlapping relationship of the slits 36 with respect to one of the first expansion body recess side walls 61 each, which is enforced by the rotational lock, facilitates this bending-in process. At some stage, the expansion sleeve 30 axially hits, with its tip in the bent-in regions, the expansion sleeve abutment walls 60', 60", 60''', 60''''. This results in a form-fit type axial interlock of the expansion sleeve 30 with the expansion body 12 at the expansion sleeve abutment walls 60', 60", 60''', 60''''. This interlock leads to a temporary change of the expansion mechanism and can result in increased pull-out resistance without excessive stress of the substrate 6.

The interface between the expansion sleeve abutment walls 60', 60", 60''', 60'''' and the expansion sleeve 30 is so designed that the interlock can be overcome on purpose at high tensile loads leading to a return of the expansion mechanism, and potentially to particularly good resistance at high loads.

Tightening of the nut 8 has a tendency to rotate the anchor bolt 10 relative to the expansion sleeve 30 in the fastening direction at the beginning of installation. However, since the second neck recess side walls 72' form the leading flanks in the fastening direction, and since it is therefore the second neck recess side walls 72' which act against the expansion sleeve 30 upon rotation of the anchor bolt 10 in the fastening direction, and since these second neck recess side walls 72' are relatively steep, this does not lead to premature radial expansion of the expansion sleeve 30 at the neck 25.

What is claimed is:

1. An expansion anchor comprising:
an anchor bolt having a front region;
an expansion sleeve surrounding the anchor bolt; and
an expansion body located in the front region of the anchor bolt, the expansion body having a converging zone for expanding the expansion sleeve, the expansion body having at least one expansion body recess, the at least one expansion body recess being delimited by an expansion sleeve abutment wall, the at least one expansion body recess having a nonaxisymmetric cross-section.

2. The expansion anchor as recited in claim 1 wherein the at least one expansion body recess has, in cross-section, a first expansion body recess side wall and a second expansion body recess side wall.

3. The expansion anchor as recited in claim 2 wherein the first expansion body recess side wall is steeper than the second expansion body recess side wall.

4. The expansion anchor as recited in claim 2 wherein the second expansion body recess side wall is convexly curved in cross-section.

5. The expansion anchor as recited in claim 2 wherein the expansion sleeve has at least one slit, originating from a front end of the expansion sleeve, the at least one slit being in, or bringable into, a position overlapping the first expansion body recess side wall by rotating the expansion sleeve around the anchor bolt.

6. The expansion anchor as recited in claim 5 further comprising a rotational lock for holding the at least one slit in the position overlapping the first expansion body recess side wall.

7. The expansion anchor as recited in claim 2 wherein the anchor bolt has a neck located adjacent to the expansion body, the neck being provided with at least one neck recess, the expansion sleeve engaging in the neck recess and wherein the at least one neck recess has, in cross-section, a first neck recess side wall and a second neck recess side wall, and the second neck recess side wall is steeper than the first neck recess side wall, the first neck recess side wall circumferentially overlapping the first expansion body recess side wall, or the second neck recess side wall circumferentially overlapping the second expansion body recess side wall.

8. The expansion anchor as recited in claim 1 wherein the anchor bolt has a neck located adjacent to the expansion body, the neck being provided with at least one neck recess, the expansion sleeve engaging in the neck recess.

9. The expansion anchor as recited in claim 8 wherein the at least one neck recess circumferentially overlaps the at least one expansion body recess.

10. The expansion anchor as recited in claim 8 wherein the at least one neck recess has a nonaxisymmetric cross-section.

11. The expansion anchor as recited in claim 8 wherein the at least one neck recess has, in cross-section, a first neck recess side wall and a second neck recess side wall, and the second neck recess side wall is steeper than the first neck recess side wall.

12. The expansion anchor as recited in claim 11 wherein the first neck recess side wall is convexly curved in cross-section.

13. The expansion anchor as recited in claim 11 wherein the anchor bolt has a thread defining a fastening direction, wherein the second neck recess side wall faces in the fastening direction.

14. The expansion anchor as recited in claim 1 wherein the at least one expansion sleeve abutment wall is for surmountably obstructing the expansion sleeve.

15. The expansion anchor as recited in claim 1 wherein the least one expansion sleeve abutment wall tapers towards a rear of the anchor bolt, a maximum slope of the at least one expansion sleeve abutment wall, measured with respect to a longitudinal axis of the anchor bolt, being greater than 30°.

16. The expansion anchor as recited in claim 1 wherein the at least one expansion sleeve abutment wall tapers towards a rear of the anchor bolt, a maximum slope of the at least one expansion sleeve abutment wall, measured with respect to a longitudinal axis of the anchor bolt, being smaller than 80°.

17. The expansion anchor as recited in claim 1 wherein the least one expansion sleeve abutment wall tapers towards a rear of the anchor bolt, a maximum slope of the at least one expansion sleeve abutment wall, measured with respect to a longitudinal axis of the anchor bolt, being greater than 30° and smaller than 80°.

18. The expansion anchor as recited in claim 1 wherein the expansion body has a plurality of expansion body recesses, each expansion body recess being delimited by an expansion sleeve abutment wall, the expansion sleeve abutment walls being arranged abreast.

19. A method for using an expansion anchor as recited in claim 1 comprising:
   moving the expansion body rearwards relative to the expansion sleeve, the expansion sleeve hitting the at least one expansion sleeve abutment wall.

* * * * *